W. A. DANIELSON.
MOTOR GENERATOR SET.
APPLICATION FILED AUG. 18, 1908.
941,439.
Patented Nov. 30, 1909.
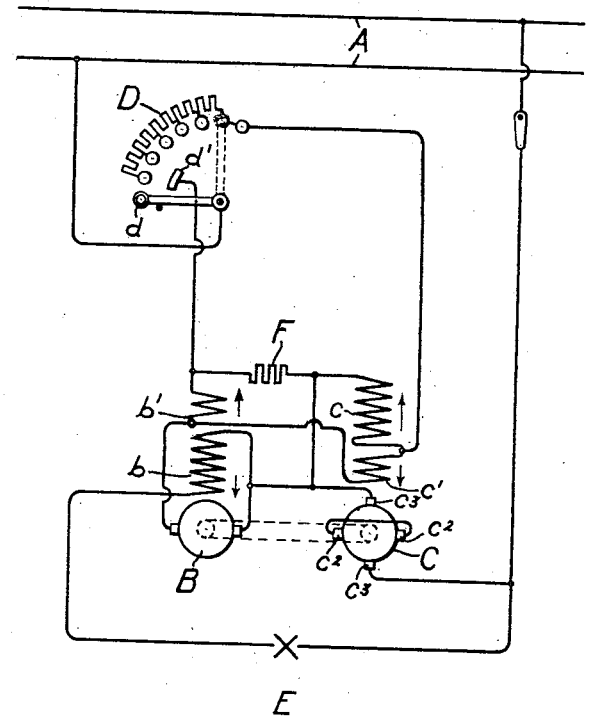
Witnesses:
Inventor:
Wilmot A. Danielson,
by _____ Att'y.

UNITED STATES PATENT OFFICE.

WILMOT A. DANIELSON, OF DES MOINES, IOWA, ASSIGNOR TO GENERAL ELECTRIC COMPANY, A CORPORATION OF NEW YORK.

MOTOR-GENERATOR SET.

941,439.  Specification of Letters Patent.  Patented Nov. 30, 1909.

Application filed August 18, 1908. Serial No. 447,527.

*To all whom it may concern:*

Be it known that I, WILMOT A. DANIELSON, a citizen of the United States, residing at Des Moines, county of Polk, State of Iowa, have invented certain new and useful Improvements in Motor-Generator Sets, of which the following is a specification.

My invention relates to motor generator sets adapted for operation on a constant potential circuit and for supplying with constant current a circuit in which the resistance varies.

My invention consists in an improvement in the motor generator set described in application, Serial No. 445081 filed July 24, 1908 by Emanuel Rosenberg and assigned to the General Electric Company. In that application is disclosed a motor generator set having the armatures of the two machines connected in series across a constant potential circuit, the generator having a set of brushes short-circuiting the armature on a line displaced approximately ninety electrical degrees from the line of field magnetization and a second set of brushes, through which the generator is connected in circuit, displaced approximately ninety electrical degrees from the first set, and a load circuit connected across the terminals of the generator.

The reason for employing a generator of this type, known in the art as the Rosenberg generator, is that such a machine when used in a motor generator set thus connected gives to the set characteristics which are not otherwise obtainable. Such a generator has a characteristic of delivering nearly constant current with variation of speed or variation of resistance in the external circuit. As the resistance in the circuit connected across the generator terminals, which may be termed the load circuit, decreases, the voltage across the motor terminals increases so that the speed of the set tends to increase; the generator current consequently tends to increase somewhat both because of the increase of speed and because of the decrease in the resistance of the load circuit. But because of the generator characteristic the increase of generator current is not great; while at the same time the motor current falls, since the energy consumed in the load circuit is decreased, so that the input of the set is decreased, while at the same time the voltage across the motor terminals is raised. Therefore since the current in the load circuit is the sum of the generator current and the motor current, the decrease in motor current may be employed to offset the increase in generator current if the machines are properly wound and connected, so that substantially constant current is maintained in the load circuit.

I have referred to the increase in motor speed as the voltage across the motor terminals rises. This presupposes that there is provided a substantially contant field excitation for the motor. Such a field excitation is employed in certain of the arrangements disclosed in the Rosenberg application above referred to, the motor field being connected in shunt to the constant potential circuit. In the set arranged in accordance with my invention, I also employ a substantially constant field excitation for the motor, but instead of a shunt winding I use a series winding connected in the load circuit. Since the current in the load circuit is constant the excitation produced by this series winding is constant, but as compared with the shunt winding it has the advantage of responding immediately to a variation in resistance on the load circuit so sudden that the set cannot immediately adjust its speed to compensate for the resistance variation. Since the variation in current which tends to follow the sudden variation in resistance flows through the main winding of the motor, the set more quickly adjusts itself to the new conditions than would be possible with a shunt winding on the motor.

Another feature of my invention consists in adding to the main field winding of the motor an auxiliary winding connected in shunt to the motor armature and opposing the main field winding. The effect of this auxiliary winding is slightly to decrease the motor excitation with increase in speed and consequently to give a slightly cumulative effect to an increase in speed. The increase in speed first increases the voltage at the motor terminals which increases the strength of the auxiliary winding, which in turn weakens the field magnetization of the motor and tends further to increase the motor speed. I have found that such a combination of windings is of assistance in maintaining perfect regulation in the load circuit.

Another feature of my invention consists in the arrangement of windings of the generator. The main generator winding I connect in shunt to the motor terminals, an arrangement disclosed in the Rosenberg application above referred to. With this connection of the generator field the field strength of the generator increases when the resistance in the load circuit falls, since the motor armature voltage then rises. I have found, however, that this increase of generator field strength may be not quite sufficient for the best regulation of the load circuit. I accordingly employ an auxiliary winding connected in series with the motor armature and opposing the main generator winding. As the resistance of the load circuit falls and the voltage at the motor terminals increases, thereby increasing the strength of the main generator winding, the motor current falls since the input to the set is decreased, and therefore the auxiliary generator winding in series with the motor is weakened so that the total generator field is further increased.

Still another feature of my invention consists in the starting connections. I arrange a rheostat in series with the motor armature with switch contacts so arranged that the auxiliary shunt winding of the motor, which is normally in opposition to the series winding, is at starting reversed so as to assist in producing the field magnetization. This reversal I obtain in a simple manner by connecting the auxiliary shunt winding of the motor in shunt to the resistance of the rheostat at starting.

My invention will best be understood by reference to the accompanying drawing which shows diagrammatically a motor generator set arranged in accordance with my invention.

In the drawing A represents a constant potential circuit from which the set is supplied; B represents the armature of the motor which is provided with a main field winding $b$ and an auxiliary field winding $b'$. C represents the armature of the generator which is provided with a main field winding $c$ and an auxiliary field winding $c'$. The generator is further provided with brushes $c^2$ which short circuit the armature on a line displaced approximately ninety electrical degrees from the line of field magnetization and a second set of brushes $c^3$, through which the generator is connected in circuit, displaced approximately ninety electrical degrees from the brushes $c^2$. The armatures of the two machines are connected in series across the constant potential mains through the auxiliary winding $c'$ of the generator and through the starting rheostat D. The load circuit, in which is indicated an arc lamp E, is connected across the terminals of the generator through the main field winding $b$ of the motor. The current in the load circuit, as has been said, is the sum of the current in the generator and motor armature. The main field winding $c$ of the generator is connected in shunt to the motor armature B, or more strictly in shunt to the motor armature B and auxiliary generator winding $c'$ in series. The generator field windings $c$, $c'$ oppose each other as is indicated by the directions of the arrows. The auxiliary field winding $b'$ of the motor is connected in shunt to the motor terminals through a resistance F and opposes the main winding $b$ as is indicated by arrows.

Omitting for the moment consideration of the starting connections and assuming that the lever $d$ of the rheostat has been moved to running position, indicated by dotted lines, and assuming that the lower wire A is positive, the current flows through the lever $d$ of the rheostat, auxiliary winding $c'$ of the generator, armature B of the motor, main field winding $b$ of the motor, through the arc lamp E, to the upper wire A. The arc lamp E is also supplied with current from the generator armature C, which current also flows through the main winding $b$ of the motor. Now if the resistance of lamp E varies, for instance, decreases, the voltage across the terminals of lamp E decreases, so that the voltage across the armature terminals of the motor increases. Assuming that the field strength of the motor remains constant the speed will rise, so that the current taken from the consant potential mains falls, both because of the lower voltage and consequently less energy consumed by the load circuit with proportionate decreased input to the set from the constant potential mains, and also because this decreased input is received by the motor at an increased voltage. That portion of the current flowing through the lamp E which is derived directly from the constant potential circuit through the motor armature therefore falls, but the increase in speed of the set, together with the reduced resistance of the load circuit, causes the generator C to deliver an increased current. This increase is the greater in amount since the main field winding $c$ of the generator is connected across the motor armature and has an increased voltage impressed on the terminals, while the current in the auxiliary opposing winding $c'$ is now decreased. By properly proportioning the windings the increase in current delivered by the generator will be made to balance the decrease in current flowing from the constant potential circuit through the motor armature directly to the load circuit, so that the current in the load circuit remains practically constant. The effect of the main motor winding $b$ is consequently to tend to maintain a constant field excitation for the motor, but has the advantage as compared with a shunt winding of responding immediately to any current variation in the load circuit produced by resistance changes too sudden for the speed of the set immediately to accommodate itself to them.

I have found that the regulation of the set is improved by giving to the motor a slightly differential characteristic. This is accomplished by means of the auxiliary motor field winding $b'$ which, in series with resistance F is in operation connected across the motor armature and opposes the main field winding, so that as the motor speed increases and as the armature voltage increases, the strength of auxiliary winding $b'$ increases so as to decrease the motor field strength and thereby further to increase the motor speed.

In order to give the motor a strong field at starting, I provide the starting rheostat with a contact $d'$ which is engaged by the rheostat lever $d$ in the starting position. This contact $d'$ connects the junction of auxiliary motor winding $b'$ and resistance F to the line side of the rheostat, and consequently connects the auxiliary winding $b'$ in shunt to the resistance of the rheostat with the direction of current flow in the winding reversed so that it now tends to assist the main winding and to give the motor a strong field at starting.

What I claim as new and desire to secure by Letters Patent of the United States, is,

1. In combination with a constant potential supply circuit, a motor generator set having the armatures connected in series across said circuit, the generator having a set of brushes short-circuiting the armature on a line displaced approximately ninety electrical degrees from the line of field magnetization and a second set of brushes, through which the armature is connected in circuit, displaced approximately ninety electrical degrees from the first set, and a load circuit of variable resistance connected across the generator armature, said generator having a main field winding in shunt to the motor armature and an auxiliary opposing winding in series with the motor armature.

2. In combination with a constant potential supply circuit; a motor generator set having the armatures connected in series across said circuit, the generator having a set of brushes short-circuiting the armature on a line displaced approximately ninety electrical degrees from the line of field magnetization and a second set of brushes, through which the armature is connected in circuit, displaced approximately ninety electrical degrees from the first set, and a load circuit of variable resistance connected across the generator armature, said motor having a field winding in series with said load circuit.

3. In combination with a constant potential supply circuit, a motor generator set having the armatures connected in series across said circuit, the generator having a set of brushes short-circuiting the armature on a line displaced approximately ninety electrical degrees from the line of field magnetization and a second set of brushes, through which the armature is connected in circuit, displaced approximately ninety electrical degrees from the first set, and a load circuit of variable resistance connected across the generator armature, said motor having a field winding in series with said load circuit, and said generator having a field winding in shunt to the motor armature.

4. In combination with a constant potential supply circuit, a motor generator set having the armatures connected in series across said circuit, the generator having a set of brushes short-circuiting the armature on a line displaced approximately ninety electrical degrees from the line of field magnetization and a second set of brushes, through which the armature is connected in circuit, displaced approximately ninety electrical degrees from the first set, and a load circuit of variable resistance connected across the generator armature, said motor having a field winding in series with said load circuit, and said generator having a field winding in shunt to the motor armature, and an auxiliary opposing winding in series with the motor armature.

5. In combination with a constant potential supply circuit, a motor generator set having the armatures connected in series across said circuit, the generator having a set of brushes short-circuiting the armature on a line displaced approximately ninety electrical degrees from the line of field magnetization and a second set of brushes, through which the armature is connected in circuit, displaced approximately ninety electrical degrees from the first set, and a load circuit of variable resistance connected across the generator armature, said motor having a field winding in series with said load circuit, and an auxiliary opposing winding in shunt to its armature.

6. In combination with a constant potential supply circuit, a motor generator set having the armatures connected in series across said circuit, the generator having a set of brushes short-circuiting the armature on a line displaced approximately ninety electrical degrees from the line of field magnetization and a second set of brushes, through which the armature is connected in circuit, displaced approximately ninety electrical degrees from the first set, and a load circuit of variable resistance connected across the generator armature, said motor having a field winding in series with said load circuit and an auxiliary opposing winding in shunt to its armature, and a starting switch arranged to connect said auxiliary winding to assist the main winding at starting.

7. In combination with a constant potential supply circuit, a motor generator set having the armatures connected in series across said circuit, the generator having a set of brushes short-circuiting the armature on a line displaced approximately ninety electrical degrees from the line of field magnetization and a second set of brushes, through which the armature is connected in circuit, displaced approximately ninety electrical degrees from the first set, a load circuit of variable resistance connected across the generator armature, said motor having a field winding in series with said load circuit and an auxiliary opposing winding in shunt to its armature, and a starting rheostat in series with the motor armature comprising contacts arranged to connect said auxiliary winding to assist the main winding at starting.

8. In combination with a constant potential supply circuit, a motor generator set having the armatures connected in series across said circuit, the generator having a set of brushes short-circuiting the armature on a line displaced approximately ninety electrical degrees from the line of field magnetization and a second set of brushes through which the armature is connected in circuit, displaced approximately ninety electrical degrees from the first set, a load circuit of variable resistance connected across the generator armature, said motor having a field winding in series with said load circuit and an auxiliary opposing winding in shunt to its armature, and a starting rheostat in series with the motor armature comprising contacts arranged to connect said auxiliary winding in shunt to the resistance of said rheostat in such manner as to assist the main winding at starting.

9. In combination with a constant potential supply circuit, a motor generator set having the armatures connected in series across said circuit, the generator having a set of brushes short-circuiting the armature on a line displaced approximately ninety electrical degrees from the line of field magnetization and a second set of brushes, through which the armature is connected in circuit, displaced approximately ninety electrical degrees from the first set, a load circuit of variable resistance connected across the generator armature, said motor having a field winding in series with said load circuit and an auxiliary opposing winding connected in shunt to its armature through a resistance, and a starting rheostat in series with the motor armature comprising contacts arranged to connect the junction between said auxiliary winding and said resistance to the line side of said rheostat at starting.

10. In combination with a constant potential supply circuit, a motor generator set having the armatures connected in series across said circuit, the generator having a set of brushes short-circuiting the armature on a line displaced approximately ninety electrical degrees from the line of field magnetization and a second set of brushes, through which the armature is connected in circuit, displaced approximately ninety electrical degrees from the first set, and a load circuit of variable resistance connected across the generator armature, said motor having a main field winding of constant strength and an auxiliary opposing winding in shunt to its armature.

In witness whereof I have hereunto set my hand this 3d day of August, 1908.

WILMOT A. DANIELSON.

Witnesses:
   PAUL P. PINKERTON,
   RAY BRAND.